US012693474B2

(12) United States Patent (10) Patent No.: US 12,693,474 B2

Takagi et al. (45) Date of Patent: Jul. 28, 2026

(54) OPTICAL COUPLER AND VISIBLE LIGHT SOURCE MODULE

(71) Applicant: TDK CORPORATION, Tokyo (JP)

(72) Inventors: Yasuhiro Takagi, Tokyo (JP); Hiroki Hara, Tokyo (JP); Atsushi Shimura, Tokyo (JP); Hajime Utsunomiya, Tokyo (JP); Jiro Yoshinari, Tokyo (JP)

(73) Assignee: TDK CORPORATION, Tokyo (JP)

( * ) Notice: Subject to any disclaimer, the term of this patent is extended or adjusted under 35 U.S.C. 154(b) by 278 days.

(21) Appl. No.: 18/539,873

(22) Filed: Dec. 14, 2023

(65) Prior Publication Data

US 2024/0219642 A1 Jul. 4, 2024

(30) Foreign Application Priority Data

Dec. 28, 2022 (JP) ................................. 2022-211898

(51) Int. Cl.
*G02B 6/293* (2006.01)
(52) U.S. Cl.
CPC ................................. *G02B 6/29344* (2013.01)
(58) Field of Classification Search
None
See application file for complete search history.

(56) References Cited

U.S. PATENT DOCUMENTS

| | | | | | |
|---|---|---|---|---|---|
| 6,061,481 | A | * | 5/2000 | Heidrich | G02B 6/4246 |
| | | | | | 385/16 |
| 6,091,870 | A | * | 7/2000 | Eldada | G02B 6/12007 |
| | | | | | 385/24 |
| 11,552,443 | B1 | * | 1/2023 | Gamache | H01S 3/1305 |

(Continued)

FOREIGN PATENT DOCUMENTS

| | | |
|---|---|---|
| CN | 115236881 A | 10/2022 |
| JP | 2012-048071 A | 3/2012 |

(Continued)

OTHER PUBLICATIONS

Translation of Jun. 2, 2026 Office Action issued in Japanese Application No. 2022-211898.

*Primary Examiner* — Jerry Rahll

(74) *Attorney, Agent, or Firm* — Oliff PLC

(57) ABSTRACT

An optical coupler includes: light input ports on a first side surface; monitoring light output ports on a second side surface; one light output port on a third side surface; and multimode-interference-type optical coupling parts, a first multimode-interference coupling part is connected to a first light-input-side waveguide on the input side, and to a first monitoring-light-output-side waveguide and a first connecting waveguide on the output side, the second multimode-interference coupling part is connected to a second light-input-side waveguide and the first connecting waveguide on the input side, and to a second monitoring-light-output-side waveguide and a second connecting waveguide on the output side, and the third multimode-interference coupling part is connected to a third light-input-side waveguide and the second connecting waveguide on the input side, and connected to a third monitoring-light-output-side waveguide and a light-output-port-connected waveguide on the output side, and the monitoring-light-output-side waveguides are free of an intersection.

10 Claims, 6 Drawing Sheets

(56)                    References Cited

U.S. PATENT DOCUMENTS

| | | | | |
|---|---|---|---|---|
| 2003/0072521 | A1* | 4/2003 | Mukai | G02F 1/2257 |
| | | | | 385/24 |
| 2004/0100257 | A1* | 5/2004 | Laham | H01S 5/4025 |
| | | | | 324/305 |
| 2012/0051687 | A1* | 3/2012 | Evans | G02B 6/125 |
| | | | | 385/24 |
| 2017/0052423 | A1 | 2/2017 | Okamoto | |
| 2018/0128979 | A1 | 5/2018 | Heanue et al. | |
| 2022/0391174 | A1* | 12/2022 | Kleijn | G02B 6/4206 |

FOREIGN PATENT DOCUMENTS

| | | | |
|---|---|---|---|
| JP | 6728596 | B2 | 7/2020 |
| JP | 2022-155468 | A | 10/2022 |
| WO | 2010/137661 | A1 | 12/2010 |
| WO | 2020/184106 | A1 | 9/2020 |
| WO | 2021/234787 | A1 | 11/2021 |

* cited by examiner

FIG. 8

OPTICAL COUPLER AND VISIBLE LIGHT SOURCE MODULE

BACKGROUND OF THE INVENTION

Field of the Invention

The present invention relates to an optical coupler and a visible light source module.

Priority is claimed on Japanese Patent Application No. 2022-211898, filed Dec. 28, 2022, the content of which is incorporated herein by reference.

Description of Related Art

XR glasses such as augmented reality (AR) glasses and virtual reality (VR) glasses are expected to be used as small-sized wearable devices. A key to popularization of wearable devices such as AR glasses and VR glasses is to miniaturize them so that every function is accommodated in glasses having ordinary sizes.

Patent Document 1 discloses a retinal projection-type display using a Mach-Zehnder optical modulator.

PATENT DOCUMENT

[Patent Document 1] Japanese Patent No. 67285%
[Patent Document 2] Japanese Unexamined Patent Application. First Publication No. 2012-48071

SUMMARY OF THE INVENTION

In the retinal projection-type display disclosed in Patent Document 1, a plurality of waveguides are placed close to each other at output, portions but they are not coupled. Accordingly, each wavelength has a different optical axis so that control of output light becomes complicated.

In addition, there has been a demand for an optical coupler which can be connected to or integrated with a visible light modulator and can adjust RGB color balance, but this is not being examined at all at present.

Regarding adjustment of RGB color balance, it is conceivable to adopt a technique in which a part of input light branches into RGB colors, the branched light beams are used as monitoring light beams, and the color balance is adjusted in accordance with light intensities of the monitoring light beams. For example. Patent Document 2 discloses a configuration of an RGB coupler using a multimode-interference-type optical coupler (MMI) but it does not disclose or suggest any configuration for adjusting the color balance.

The present invention has been made in consideration of the foregoing circumstances, and an object thereof is to provide an optical coupler and a visible light source module which can be connected to or integrated with an optical modulator using a lithium niobate film and can adjust RGB color balance.

In order to resolve the foregoing problems, the present invention provides the following means.

According to Aspect 1 of the present invention, there is provided an optical coupler which couples a plurality of visible light beans having different wavelengths and has four side surfaces, the optical coupler including: a plurality of light input ports that are disposed on a first side surface of the optical coupler and are configured for each of the visible light beams output from a plurality of visible laser light sources to be input to each of the light input ports, respectively; a plurality of monitoring light output ports that are disposed on a second side surface of the optical coupler and are configured to output monitoring light beams to at least one photodetector monitoring outputs of the visible light beams from the laser light sources; one light output port that is disposed on a third side surface of the optical coupler and is configured for a coupled light beam, in which all visible light beams output from the visible laser light sources are coupled, to be output; and a plurality of multimode-interference-type optical coupling parts, wherein, among the multimode-interference-type optical coupling parts, a first multimode-interference-type optical coupling part is configured to be used with one input and two outputs, a light input side thereof being connected to a first light-input-aide waveguide, which is connected to a first light input port among the light input ports, and a light output side thereof being connected to a first monitoring-light-output-side waveguide, which is connected to a first monitoring light output port among the monitoring light output ports, and a first connecting waveguide, which is connected to an light input side of a second multimode-interference-type optical coupling part, the second multimode-interference-type optical coupling part is configured to be used with two inputs and two outputs, a light input side thereof being connected to a second light-input-side waveguide, which is connected to a second light input port among the light input ports, and the first connecting waveguide, and a light output side thereof being connected to a second monitoring-light-output-side waveguide, which is connected to a second monitoring light output port among the monitoring light output ports, and a second connecting waveguide, which is connected to a light input side of a third multimode-interference-type optical coupling part, and the third multimode-interference-type optical coupling part is configured to be used with two inputs and two outputs, a light input side thereof being connected to a third light-input-side waveguide, which is connected to a third light input port among the light input ports, and the second connecting waveguide, and a light output side thereof being connected to a third monitoring-light-output-side waveguide, which is connected to a third monitoring light output port among the monitoring light output ports, and a light-output-port-connected waveguide connected to the light output port, and the first monitoring-light-output-side waveguide, the second monitoring-light-output-side waveguide, and the third monitoring-light-output-side waveguide are free of an intersection with any waveguides.

According to Aspect 2 of the present invention, the optical coupler according to Aspect 1 includes a substrate that is made of a material different from lithium niobate; and an optical coupling function layer that is formed on a main surface of the substrate and is made of lithium niobate, wherein the light input ports, the monitoring light output ports, the light output port, the multimode-interference-type optical coupling parts, the first light-input-side waveguide, the second light-input-side waveguide, the third light-input-side waveguide, the first monitoring-light-output-side waveguide, the second monitoring-light-output-side waveguide, the third monitoring-light-output-side waveguide, the first connecting waveguide, the second connecting waveguide, and the light-output-port-connected waveguide are formed in the optical coupling function layer.

According to Aspect 3 of the present invention, in the optical coupler according to Aspect 1 or 2, the plurality of multimode-interference-type optical coupling parts consists of three multimode-interference-type optical coupling parts.

According to Aspect 4 of the present invention, in the optical coupler according to any one of Aspects 1 to 3, at least one multimode-interference-type optical coupling part of the multimode-interference-type optical coupling parts has a trapezoidal cross section cut in a direction perpendicular to a traveling direction of light.

According to Aspect 5 of the present invention, in the optical coupler according to Aspect 4, an inclination angle of the trapezoidal shape is 40° to 85°.

According to Aspect 6 of the present invention, in the optical coupler according to Aspect 4 or 5, the multimode-interference-type optical coupling part having the trapezoidal cross section has a slab portion on the substrate side.

According to Aspect 7 of the present invention, in the optical coupler according to any one of Aspects 1 to 6, a slab portion is provided in at least a part of the first light-input-side waveguide, the second light-input-side waveguide, the third light-input-side waveguide, the first monitoring-light-output-side waveguide, the second monitoring-light-output-side waveguide, the third monitoring-light-output-side waveguide, the first connecting waveguide, the second connecting waveguide, and the light-output-port-connected waveguide.

According to Aspect 8 of the present invention, there is provided a visible light source module including the optical coupler according to any one of Aspects 1 to 7, and a plurality of visible laser light sources that are configured to output visible light beams to be coupled by the optical coupler.

According to Aspect 9 of the present invention, there is provided an optical coupler with an optical modulation function including the optical coupler according to any one of Aspects 1 to 7, and a Mach-Zehnder optical modulator that is connected to the optical coupler and is configured to guide a plurality of visible light beams output from a plurality of visible laser light sources to the optical coupler.

According to Aspect 10 of the present invention, them is provided a visible light source module including the optical coupler with an optical modulation function according to Aspect 9, and a plurality of visible laser light sources that are configured to output visible light beams to be coupled by the optical coupler with an optical modulation function.

According to the present invention, it is possible to provide an optical coupler which can be connected to or integrated with an optical modulator using a lithium niobate film and can adjust RGB color balance.

BRIEF DESCRIPTION OF THE DRAWINGS

FIG. 8 is a schematic plan view of a visible light source module according to a second embodiment.

DETAILED DESCRIPTION OF THE INVENTION

Figure 1:
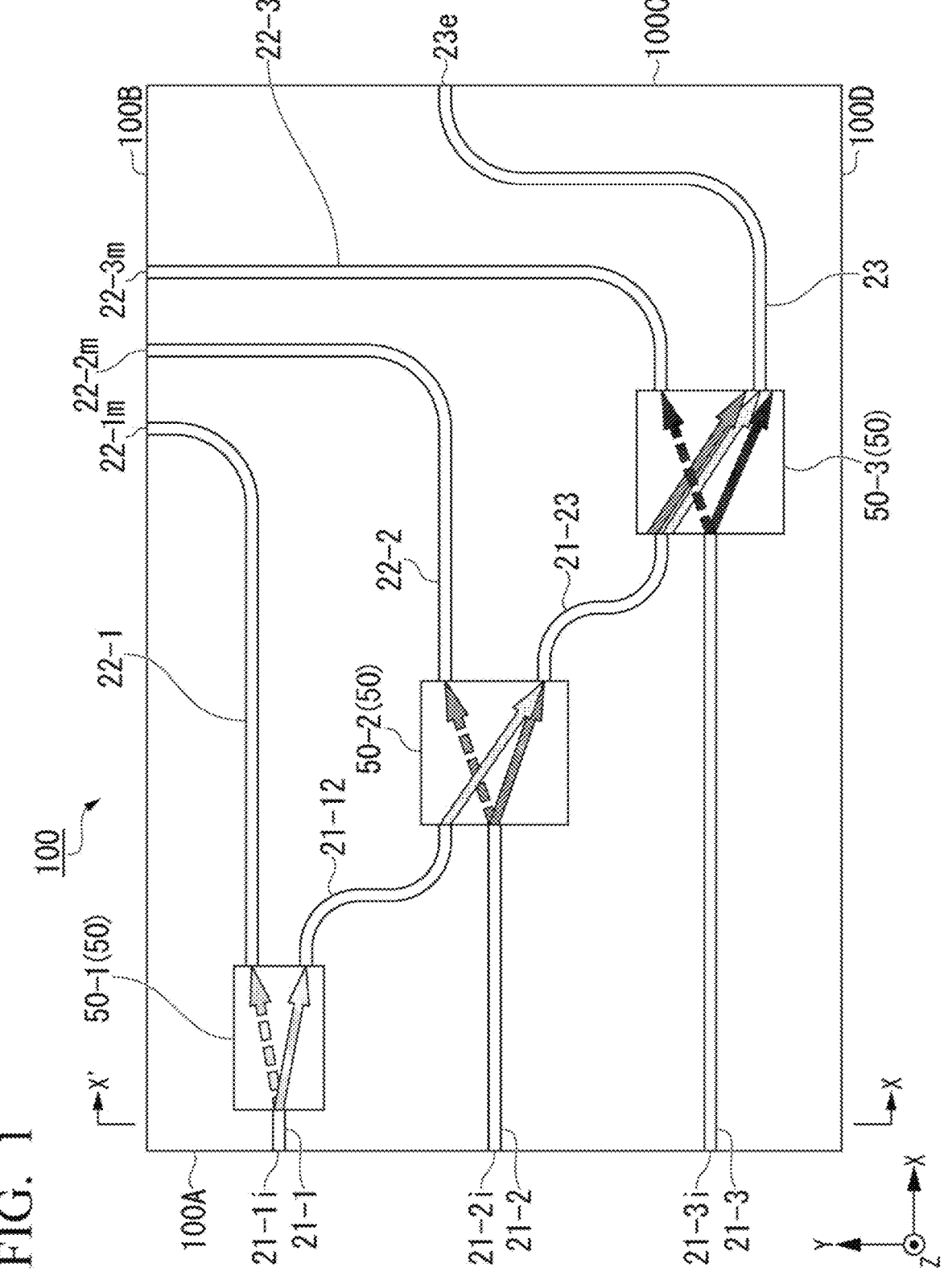
FIG. 1 is a schematic plan view of an optical coupler according to the present embodiment.

Hereinafter, embodiments will be described in detail suitably with reference to the drawings. In the drawings used in the following description, in order to make characteristics easy to understand, characteristic portions may be illustrated in an enlarged manner for the sake of convenience, and dimensional ratios or the like of each constituent element may differ from actual values thereof. Materials, dimensions, and the like illustrated in the following description are merely exemplary examples. The present invention is not limited thereto and can be suitably changed and performed within a range in which the effects of the present invention are exhibited.

[Optical Coupler]

FIG. 1 is a schematic plan view of an optical coupler according to the present embodiment. FIG. 1 is an example of an optical coupler that can be used for a visible light source module including three visible laser light sources outputting respective RGB visible light beams.

An optical coupler 100 illustrated in FIG. 1 is an optical coupler which couples a plurality of visible light beams having different wavelengths and has four side surfaces 100A, 100B, 100C, and 100D. The optical coupler 100 illustrated in FIG. 1 has a rectangular shape with four angles of 90° in a plan view (viewed in a Z direction), but it is not limited to a rectangular shape with four angles of 90°.

The optical coupler 100 illustrated in FIG. 1 includes three light input ports 21-1i, 21-2i, and 21-3i that are disposed on the first side surface 100A of the optical coupler. They are configured for each of the visible light beams output from a plurality of visible laser light sources to be input to each of the light input ports, respectively. The optical coupler 100 also includes three monitoring light output ports 22-1m, 22-2m, and 22-3m that are disposed on a second side surface 100B of the optical coupler. They are configured to output monitoring light beams to three photodetectors monitoring outputs of the visible light beams from the laser light sources. The optical coupler 100 also includes one light output port 23e that is disposed on a third side surface 100C of the optical coupler. It is configured for a coupled light beam, in which all visible light beams output from the visible laser light sources are coupled, to be output. Here, the three light input ports 21-1i, 21-2i, and 21-3i may be disposed close to each other so that light is output to one photodetector. In that case, RGB color balance can be adjusted by causing three RGB visible laser light sources to emit light beams one by one and monitoring outputs of visible light beams output from the respective visible laser light sources.

If the optical coupler 100 illustrated in FIG. 1 is used, a part of light input from the visible laser light sources branches for respective colors and it can be derived as monitoring light beams for respective colors so that color balance can be adjusted.

In FIG. 1, an X direction is a direction orthogonal to the side surface having the light input port disposed thereon, a Y direction is a direction orthogonal to the X direction, and the Z direction is a direction orthogonal to a plane formed in the X direction and the Y direction.

The optical coupler 100 illustrated in FIG. 1 further includes three multimode-interference-type optical coupling parts 50 (50-1, 50-2, and 50-3).

The first multimode-interference-type optical coupling part 50-1 of the three multimode-interference-type optical coupling parts is configured to be used with one input and two outputs, in which a light input side is connected to a first light-input-side waveguide 21-1 that is connected to the first light input port 21-1i of the three light input ports, and in which a light output side is connected to a first monitoring-light-output-side waveguide 22-1 that is connected to the first monitoring light output port 22-1m of the three monitoring light output ports and a first connecting waveguide 21-12 that is connected to the light input side of the second multimode-interference-type optical coupling part 50-2.

In addition, the second multimode-interference-type optical coupling part 50-2 is configured to be used with two inputs and two outputs, in which the light input side is connected to a second light-input-side waveguide 21-2 that is connected to the second light input port 21-2i of the three light input ports and the first connecting waveguide 21-12, and in which the light output side is connected to a second monitoring-light-output-side waveguide 22-2 that is connected to the second monitoring light output port 22-2m of the three monitoring light output pons and a second connecting waveguide 21-23 that is connected to the light input side of the third multimode-interference-type optical coupling part 50-3.

In addition, the third multimode-interference-type optical coupling pan 50-3 is configured to be used with two inputs and two outputs, in which the light input side is connected to a third light-input-side waveguide 21-3 that is connected to the third light input port 21-3i of the three light input ports and the second connecting waveguide 21-23, and in which the light output side is connected to a third monitoring-light-output-side waveguide 22-3 that is connected to the third monitoring light output port 22-3m of the three monitoring light output pons and a light-output-port-connected waveguide 23 that is connected to a light output port 23e.

The first multimode-interference-type optical coupling part 50-1 is configured to be used with one input and two outputs, but it is not necessarily an MMI which is configured to be used with only one input and two outputs. It may have a configuration having a plurality of input ports and three or more output ports, of which only one input and two outputs are used.

Similarly, the second multimode-interference-type optical coupling pan 50-2 and the third multimode-interference-type optical coupling part 50-3 are usable with two inputs and two outputs, but they are not necessarily MMIs which are usable with only two inputs and two outputs. They may have a configuration having three or more input ports and three or more output ports, of which only two inputs and two outputs are used.

The first monitoring-light-output-side waveguide 22-1, the second monitoring-light-output-side waveguide 22-2, and the third monitoring-light-output-side waveguide 22-3 are free of an intersection with any waveguides (in the configuration of FIG. 1, all the waveguides other than the first monitoring-light-output-side waveguide 22-1, the second monitoring-light-output-side waveguide 22-2, and the third monitoring-light-output-side waveguide 22-3) leading to a light output from the light output port 23e. If they intersect a waveguide leading to a light output from the light output port 23e, scattering or the like at the intersection causes a loss in light output from the light output port 23e. Hereinafter, such a loss may be referred to as "an intersection loss".

No intersection loss occurs in the optical coupler 100 illustrated in FIG. 1. The optical coupler 100 illustrated in FIG. 1 is an optical coupler in which an intersection loss is eliminated.

In this regard, a comparison will be performed with an optical coupler having a configuration in which monitoring-light-output-side waveguides intersect other waveguides.

Figure 2:
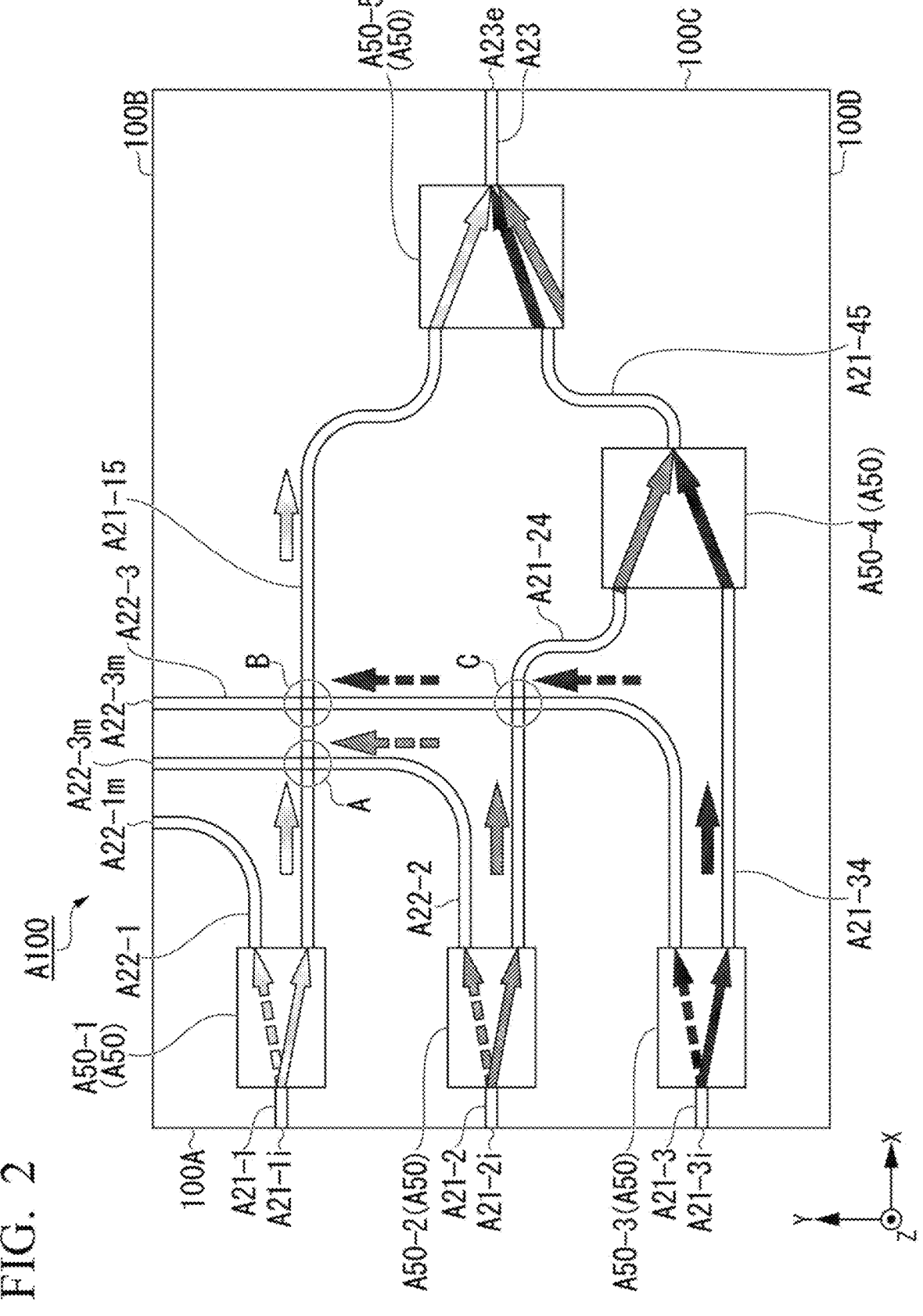
FIG. 2 is a schematic plan view of an optical coupler of a comparative example.

FIG. 2 illustrates an optical coupler having a configuration in which monitoring-light-output-side waveguides intersect other waveguides. An optical coupler A100 illustrated in FIG. 2 includes three light input ports A21-1i, A21-2i, and A21-3i that are disposed on the first side surface 100A of the optical coupler. They are configured for each of the visible light beams output from three visible laser light sources to be input to each of the light input ports, respectively. The optical coupler A100 also includes three monitoring light output ports A22-1m, A22-2m, and A22-3m that are disposed on the second side surface 100B of the optical coupler. They are configured output monitoring light beams to three photodetector monitoring outputs of the visible light beams from the three laser light sources. The optical coupler A100 also includes one light output port A23e that is disposed on the third side surface 100C of the optical coupler. It is configured for a coupled light beam, in which all three visible light beams output from the three visible laser light sources are coupled, to be output The optical coupler A100 illustrated in FIG. 2 further includes five multimode-interference-type optical coupling parts A50 (A50-1, A50-2, A50-3, A50-4, and A50-5).

The first multimode-interference-type optical coupling part A50-1 of the five multimode-interference-type optical coupling parts is configured to be used with one input and two outputs, in which a light input side is connected to a first light-input-side waveguide A21-1 that is connected to the first light input port A21-1i of the three light input ports, and in which a light output side is connected a first monitoring-light-output-side waveguide A22-1 that is connected to the first monitoring light output port A22-1m of the three monitoring light output ports and a first connecting waveguide A21-15 that is connected to the light input side of the fifth multimode-interference-type optical coupling part A50-5.

In addition, the second multimode-interference-type optical coupling part A50-2 is configured to be used with one input and two outputs, in which the light input side is connected to a second light-input-side waveguide A21-2 that is connected to the second light input port A21-2i of the three light input ports, and in which the light output side is connected to a second monitoring-light-output-side waveguide A22-2 that is connected to the second monitoring light output port A22-2m of the three monitoring light output ports and a second connecting waveguide A21-24 that is connected to the light input side of the fourth multimode-interference-type optical coupling part A50-4.

In addition, the third multimode-interference-type optical coupling part A50-3 is configured to be used with one input and two outputs, in which the light input side is connected to a third light-input-side waveguide A21-3 that is connected to the third light input port A21-3i of the three light input ports, and in which the light output side is connected to a third monitoring-light-output-side waveguide A22-3 that is connected to the third monitoring light output port A22-3m of the three monitoring light output ports and a third connecting waveguide A21-34 that is connected to the light input side of the fourth multimode-interference-type optical coupling part A50-4.

In addition, the fourth multimode-interference-type optical coupling part A50-4 is configured to be used with two inputs and one output, in which the light input side is connected to the second connecting waveguide A21-24 and the third connecting waveguide A21-34, and in which the light output side is connected to a fourth connecting waveguide A21-45 that is connected to the light input side of the fifth multimode-interference-type optical coupling part A50-5.

In addition, the fifth multimode-interference-type optical coupling part A50-5 is configured to be used with two inputs and one output, in which the light input side is connected to the first connecting waveguide A21-15 and the fourth connecting waveguide A21-45, and in which the light output side is connected to a light-output-port-connected waveguide A23 that is connected to a light output port A23e.

In the optical coupler A100 illustrated in FIG. 2, the first monitoring-light-output-side waveguide A22-1 does not intersect any other waveguides.

Meanwhile, the second monitoring-light-output-side waveguide A22-2 intersects the first connecting waveguide A21-15 (the circled spot marked with the reference sign A in FIG. 2). In addition, the third monitoring-light-output-side waveguide A22-3 also intersects the first connecting waveguide A21-15 (the circled spot marked with the reference sign B in FIG. 2) and further intersects the second connecting waveguide A21-24 (the circled spot marked with the reference sign C in FIG. 2). Therefore, in the optical coupler A100 illustrated in FIG. 2, an intersection loss occurs at three spots.

Regarding a positional relationship between the light input port, the monitoring light output port, and the light output port, the optical coupler 100 illustrated in FIG. 1 has a configuration in which the side surface (side surface 100A) having the light input port disposed thereon and the side surface (side surface 100B) having the monitoring light output port disposed thereon are surfaces adjacent to each other and the side surface (side surface 100A) having the light input port disposed thereon and the side surface (side surface 100C) having the light output port disposed thereon are surfaces facing each other in the X direction, but the configuration is not limited to this.

For example, the optical coupler 100 illustrated in FIG. 1 may adopt a configuration in which the light output port is disposed on the side surface 100D, that is, a configuration in which the side surface having the monitoring light output port disposed thereon and the side surface having the light output port disposed thereon are surfaces facing each other in the Y direction.

Alternatively, a configuration in which the monitoring light output port is disposed on the side surface 100C and the light output port is disposed on the side surface 100D may be adopted. That is, a configuration in which the side surface having the light input port disposed thereon and the side surface having the monitoring light output port disposed thereon are surfaces facing each other in the X direction and the side surface having the light input port disposed thereon and the side surface having the light output port disposed thereon are surfaces adjacent to each other may be adopted.

The optical coupler 100 illustrated in FIG. 1 is an example of an optical coupler that can be used for a visible light source module including three visible laser light sources. An example of a configuration of an optical coupler that can be used for a visible light source module including N (N>3) visible laser light sources will be described below.

Such an optical coupler includes the N (N is an integer equal to or larger than 3) light input ports that are disposed on a first side surface of the optical coupler and are configured for each of the visible light beams output from N visible laser light sources to be input to each of the light input ports, respectively; N monitoring light output ports that are disposed on a second side surface of the optical coupler and are configured to output monitoring light beams to N photodetector monitoring outputs of the visible light beams from the laser light sources; one light output port that is disposed on a third side surface of the optical coupler and is configured for a coupled light beam, in which all visible light beams output from the visible laser light sources are coupled, to be output; and N multimode-interference-type optical coupling parts.

Among the multimode-interference-type optical coupling parts, a first multimode-interference-type optical coupling part is configured to be used with one input and two outputs, a light input side thereof being connected to a first light-input-side waveguide, which is connected to a first light input port among the N light input ports, and a light output side thereof being connected to a first monitoring-light-output-side waveguide, which is connected to a first monitoring light output port among the N monitoring light output ports, and a first connecting waveguide, which is connected to an light input side of a second multimode-interference-type optical coupling part.

The second multimode-interference-type optical coupling part is configured to be used with two inputs and two outputs, a light input side thereof being connected to a second light-input-side waveguide, which is connected to a second light input port among the N light input ports, and the first connecting waveguide, and a light output side thereof being connected to a second monitoring-light-output-side waveguide, which is connected to a second monitoring light output port among the N monitoring light output ports, and a second connecting waveguide, which is connected to a light input side of a third multimode-interference-type optical coupling pat.

The (N–1)th multimode-interference-type optical coupling part is configured to be used with two inputs and two outputs, a light input side thereof being connected to a third light-input-side waveguide, which is connected to a (N–1)th light input port among the N light input ports, and an (N–2)th connecting waveguide, and a light output side thereof being connected to a (N–1)th monitoring-light-output-side waveguide, which is connected to a (N–1)th monitoring light output port among the N monitoring light output ports, and a (N–1)th connecting waveguide, which is connected to a light input side of an Nth multimode-interference-type optical coupling part The Nth multimode-interference-type optical coupling part is configured to be used with two inputs and two outputs, a light input side thereof being connected to an Nth light-input-side waveguide, which is connected to a Nth light input port among the N light input ports, and the (N–1)th connecting waveguide, and a light output side thereof being connected to a Nth monitoring-light-output-side waveguide, which is connected to a Nth monitoring light output port among the N monitoring light output ports, and a light-output-port-connected waveguide connected to the light output port.

The first to the Nth monitoring-light-output-side waveguides are free of an intersection with any waveguides.

Regarding the optical coupler 100 illustrated in FIG. 1, an example of dimensions when the first multimode-interference-type optical coupling part. 50-1, the second multimode-interference-type optical coupling part 50-2, and the third multimode-interference-type optical coupling part 50-3 are respectively used for green light, blue light, and red light in this order will be described.

Length (X direction) of the first multimode-interference-type optical coupling part 50-1: 50 to 200 µm Width (Y direction) of the first multimode-interference-type optical coupling part 50-1: 4 to 10 µm Length (X direction) of the second multimode-interference-type optical coupling part 50-2: 100 to 1,000 µm Width (Y direction) of the second multimode-interference-type optical coupling part 50-2: 8 to 20 µm Length (X direction) of the third multimode-interference-type optical coupling part 50-3: 100 to 1,000 µm Width (Y direction) of the third multimode-interference-type optical coupling part 50-3: 8 to 20 µm Distance between the green light input port 21-1$i$ and the blue light input port 21-2$i$: 150 to 2,000 µm Distance between the blue light input port 21-2$i$ and the red light input port 21-3$i$: 150 to 2,000 µm Lengths (Y direction) of the side surface 100A and the side surface 100C: 420 to 5,000 µm Lengths (Y direction) of the side surface 100B and the side surface 100D: 500 to 10,000 µm When the first multimode-interference-type optical coupling pan 50-1, the second multimode-interference-type optical coupling part 50-2, and the third multimode-interference-type optical coupling part 50-3 are respectively used for green light, blue light, and red light in this order, operational effects of the optical coupler illustrated in FIG. 1 will be described.

Green light input from the green light input port 21-1$i$ is propagated through the first light-input-side waveguide 21-1, is input to the first multimode-interference-type optical coupling part 50-1, and branches. One of the branched green light beams is propagated through the first monitoring-light-output-side waveguide 22-1, is output from the first monitoring light output port 22-1$m$, and is input to the photodetector.

Meanwhile, the other of the branched green light beams is propagated through the first connecting waveguide 21-12 and is input to the second multimode-interference-type optical coupling part 50-2.

Blue light input from the blue light input port 21-2$i$ is propagated through the second light-input-side waveguide 21-2, is input to the second multimode-interference-type optical coupling part 50-2, and branches. One of the branched blue light beams is propagated through the second monitoring-light-output-side waveguide 22-2, is out from the second monitoring light output port 22-2$m$, and is input to the photodetector.

Meanwhile, the other of the branched blue light beams is propagated through the second connecting waveguide 21-23 together with the other branched green light beam that has been input, and they are input to the third multimode-interference-type optical coupling part 50-3.

Red light input from the red light input port 21-3$i$ is propagated through the third light-input-side waveguide 21-3, is input to the third multimode-interference-type optical coupling part 50-3, and branches. One of the branches red light beams is propagated through the third monitoring-light-output-side waveguide 22-3, output from the third monitoring light output port 22-3$m$, and is input to the photodetector. Meanwhile, the other of the branches red light beams is propagated through the light-output-port-connected waveguide 23 together with the other branched green light beam and the other branched blue light beam that have been input, and coupled RGB light is output from the light output port 23$e$.

Since none of the first monitoring-light-output-side waveguide 22-1, the second monitoring-light-output-side waveguide 22-2, and the third monitoring-light-output-side waveguide 22-3 intersects other waveguides. RGB light output from the light output port 23$e$ is output without receiving an intersection loss.

The optical coupler according to the present invention includes at least one multimode-interference-type optical coupling part that is configured to be used with one input and two outputs and at least two multimode-interference-type optical coupling pans that is configured to be used with two inputs and two outputs.

Figure 3:
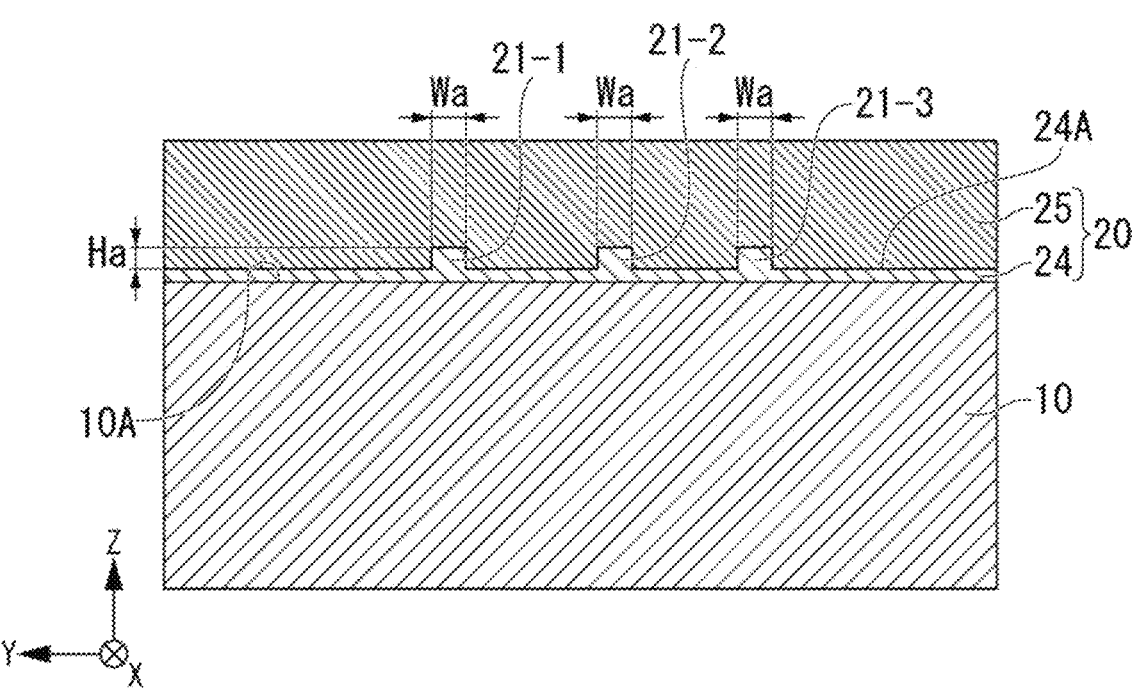
FIG. 3 is a schematic cross-sectional view of an optical coupler, in which the constituent elements illustrated in FIG. 1 are formed in an optical coupling function layer made of lithium niobate, cut along X-X' in FIG. 1.

FIG. 3 is a schematic cross-sectional view of an optical coupler 200, in which the constituent elements illustrated in FIG. 1 are formed in an optical coupling function layer made of lithium niobate, cut along a YZ plane (X-X' in FIG. 1).

The optical coupler 200 illustrated in FIG. 3 includes a substrate 10 that is made of a material different from lithium niobate, and an optical coupling function layer 20 that is formed on a main surface of the substrate 10 and is made of lithium niobate. The light input port, the monitoring light output port, the light output port, the multimode-interference-type optical coupling part, the first light-input-side waveguide, the second light-input-side waveguide, the third light-input-side waveguide, the first monitoring-light-output-side waveguide, the second monitoring-light-output-side waveguide, the third monitoring-light-output-side waveguide, the first connecting waveguide, the second connecting waveguide, and the light-output-port-connected waveguide are formed in the optical coupling function layer 20.

In the optical coupler 200, by using a lithium niobate film having large Δn, the radius of curvature of the waveguide can be reduced. Moreover, by using a multimode-interference-type optical coupling part, increase in coupling length can be further prevented compared to when a directional coupler is used, and therefore both improvement in degree of freedom of design and miniaturization can be achieved.

The optical coupling function layer 20 is constituted of a waveguide core film 24 that is constituted of a lithium niobate film in which the light input port, the monitoring light output port, the light output port, the multimode-interference-type optical coupling part, the first light-input-side waveguide, the second light-input-side waveguide, the third light-input-side waveguide, the first monitoring-light-output-side waveguide, the second monitoring-light-output-side waveguide, the third monitoring-light-output-side waveguide, the first connecting waveguide, the second connecting waveguide, and the light-output-port-connected waveguide are formed; and a waveguide cladding (buffer) film 25 which is formed on the waveguide core film 24 such that these are covered.

Hereinafter, the reference sign 24 may be used for a lithium niobate film.

Examples of the substrate 10 can include a sapphire substrate, a Si substrate, and a thermal oxidation silicon substrate.

Since the optical coupling function layer 20 is constituted of a lithium niobate ($LiNbO_3$) film, it is not particularly limited as long as it has a lower refractive index than a lithium niobate film. However, it is preferable to use a sapphire single-crystal substrate or a silicon single-crystal substrate as a substrate on which a single crystal lithium niobate film can be formed as an epitaxial film. The crystal orientation of a single-crystal substrate is not particularly limited. However, for example, since a c-axis oriented lithium niobate film has 3-fold symmetry, it is desirable that the single-crystal substrate (base) also have the same symmetry. It is preferable that a substrate with a c plane be used in the case of a sapphire single-crystal substrate and a substrate with a (111) plane be used in the case of a silicon single-crystal substrate.

For example, a lithium niobate film is a c-axis oriented lithium niobate film. For example, a lithium niobate film is an epitaxial film that is epitaxially grown on the substrate 10. An epitaxial film is a single crystal film having a crystal orientation aligned depending on a base substrate. An epitaxial film is a film which has a single crystal orientation in the z direction and an in-plane direction of an xy plane and in which crystals are aligned and oriented together in directions of the x axis, the y axis, and the z axis. It is possible to verify whether a film formed on the substrate 10 is an epitaxial film, for example, by confirming the peak intensity and the pole at the orientation position in 2θ-θ X-ray diffraction.

Specifically, when measurement is performed using 2θ-θ X-ray diffraction, all peak intensities other than a target plane are equal to or less than 10% and are preferably equal to or less than 5% of the maximum peak intensity of the target plane. For example, when the lithium niobate film is a c-axis oriented epitaxial film, the peak intensities other than that of a (00L) plane are equal to or less than 10% and are preferably equal to or less than 5% of the maximum peak intensity of the (00L) plane. Here, (00L) is a generic term for equivalent planes such as (001) and (002).

In addition, conditions for confirming the peak intensity at an orientation position described above only indicate orientation in one direction. Thus, even if the conditions described above are met, when the crystal orientation is not aligned within a plane, the intensity of X-rays will not increase at a particular angular position and no pole will be observed. For example, when the lithium niobate film is a lithium niobate film, since $LiNbO_3$ has a trigonal crystal structure, $LiNbO_3$ (014) in the single crystal has three poles. In the case of lithium niobate, it is known that epitaxial growth occurs in a so-called twin crystal state in which crystals rotated 180° centering on the c-axis are symmetrically coupled. In this case, since three pairs of poles are in a state in which two poles are symmetrically coupled, there are six poles. In addition, when a lithium niobate film is formed on a silicon single-crystal substrate on a (100)-plane, since the substrate has 4-fold symmetry, twelve poles (4×3=12) are observed. In the present disclosure, a lithium niobate film epitaxially grown in a twin-crystal state is also included in an epitaxial film.

The composition of lithium niobate is $Li_xNbA_yO_z$. A is an element other than Li, Nb, and O. The factor x is 0.5 to 1.2 and is preferably 0.9 to 1.05. The factor y is 0 to 0.5. The factor z is 1.5 to 4.0 and is preferably 2.5 to 3.5. For example, the element A is K, Na, Rb, Cs, Be, Mg, Ca, Sr, Ba, Ti, Zr, Hf, V, Cr, Mo, W, Fe, Co, Ni, Zn, Sc, or Ce, and two or more of these elements may be combined.

Moreover, the lithium niobate film may be a lithium niobate single crystal thin film bonded to a substrate thereon.

The film thickness of the lithium niobate film is 2 m or shorter, for example. The film thickness of the lithium niobate film is a film thickness of a part other than a ridge. The film thickness of the lithium niobate film may be optimally designed suitably in accordance with the wavelength used, the ridge shape, or the like.

The waveguide is a ridge protruding from a first surface 24A of the lithium niobate film 24. The first surface 24A is an upper surface of a part (slab layer) other than the ridge portion of the lithium niobate film 24.

As illustrated in FIG. 3, in the first light-input-side, waveguide 21-1, the second light-input-side waveguide 21-2, and the third light-input-side waveguide 21-3, a cross-sectional shape formation part has a rectangular cross-sectional shape. However, they may have a shape capable of guiding light. For example, they may have a trapezoidal shape, a triangular shape, a semicircular shape, or the like. A width Wa of each of three ridges in the y direction is preferably 0.2 μm to 5.0 μm, and the height (a protrusion height Ha of the first surface 24A) of each of the three ridge portions is preferably 0.1 μm to 1.0 μm, for example. The same applies to other waveguides.

By causing the first light-input-side waveguide 21-1, the second light-input-side waveguide 21-2, the third light-input-side waveguide 21-3, and other waveguides illustrated in FIG. 1 to have a size corresponding to the degree of the wavelength of laser light, propagation can be performed in a single mode.

<Multimode-Interference-Type Optical Coupling Part>

(1) Multimode-interference-type optical coupling pan having trapezoidal cross section The multimode-interference-type optical coupling pan illustrated in FIG. 1 is a multimode-interference-type optical coupling part with one input and two outputs and a multimode-interference-type optical coupling part with two inputs and two outputs.

Figure 4:
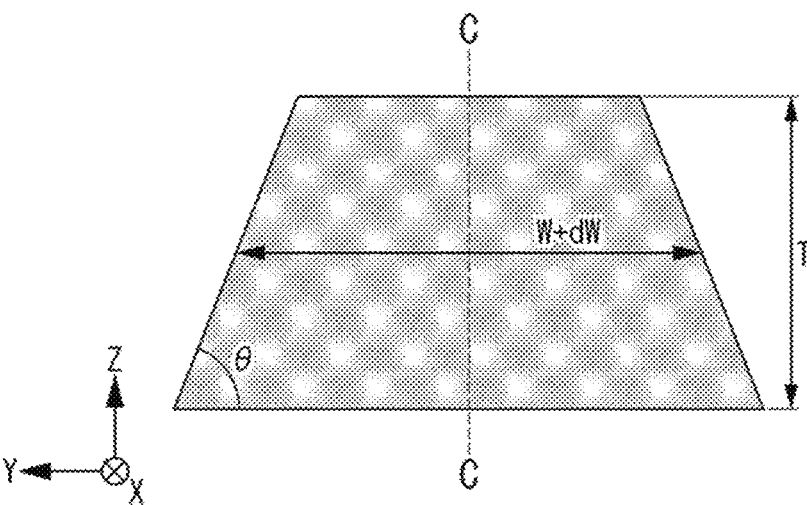
FIG. 4 is a schematic cross-sectional view cut along a YZ plane when a multimode-interference-type optical coupling part has a trapezoidal cross section.

In some cases, it is preferable that a multimode-interference-type optical coupling pan have a trapezoidal cross section cut in a direction perpendicular to a traveling direction of light as illustrated in FIG. 4. In addition, in some cases, it is preferable that an inclination angle θ of this trapezoidal shape be 40° to 85°.

This is because the dimensional margin of a width W of the multimode-interference-type optical coupling part is improved, the optimum width of the multimode-interference-type optical coupling part increases, and processing is facilitated.

This result is obtained through a simulation by comparing the propagation loss of RGB three-color light between when the cross section of the multimode-interference-type optical coupling pan cut in a direction perpendicular to the traveling direction of light has a trapezoidal shape and when it has a rectangular shape.

Regarding a model used in this simulation, the height T of the multimode-interference-type optical coupling part (ridge) is 0.7 μm, and the width of the multimode-interference-type optical coupling part at ½ of the height T is W. The simulation of a propagation loss at the time of RGB coupling has been performed by fixing the center C-C of the ridge and widening or narrowing it by dW/2 on both sides (therefore, dW in total) while having the inclination angle θ between the lower surface and the inclination portion fixed.

When θ is 85°, 70°, and 40° the margins were 0.3 μm in all cases. In addition, the optimum widths W were respectively 6.6 μm, 6.6 μm, and 6.9 μm.

(2) Multimode-Interference-Type Optical Coupling Part Having Slab Portion

Figure 5:
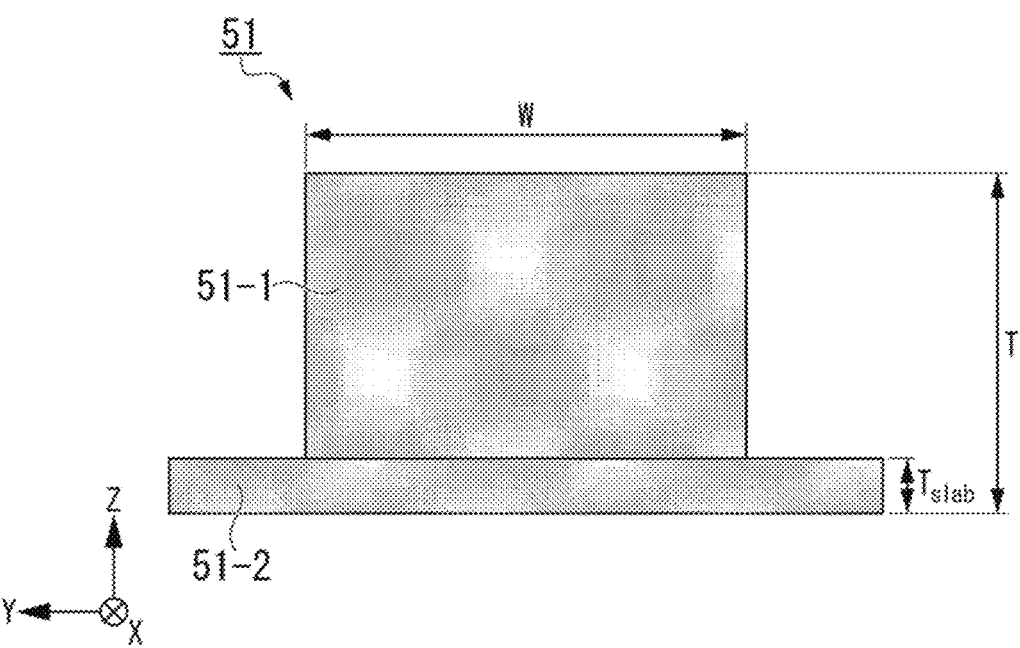
FIG. 5 is a schematic cross-sectional view cut along a YZ plane when a multimode-interference-type optical coupling part has a slab portion on a substrate side.

The multimode-interference-type optical coupling part may be provided with a slab portion on the substrate side as illustrated in FIG. 5.

A multimode-interference-type optical coupling part 51 illustrated in FIG. 5 has a ridge 51-1 and further has a slab portion 51-2 on the substrate side.

By having a slab portion, the width dimensional margin may further increase and processing may be further facilitated. In addition, the optimum width W may further increase and processing may be further facilitated. When the multimode-interference-type optical coupling part had a configuration of the model illustrated in FIG. 5, the simulation of a propagation loss (dB) of each of three RGB colors in the single mode (TM0) and high-order modes (TM1, TM2) at the time of RGB coupling was performed. It was assumed that a height Tslab of the slab portion was 0.2 μm and the height T of the multimode-interference-type optical coupling part was the sum of the height of the ridge 51-1 and the height of the slab portion 51-2. It was assumed that the width W of the multimode-interference-type optical coupling part is 6.5 μm.

As a comparison, the propagation losses of light when there is no slab portion and when there is a slab portion were compared, and the difference between the propagation losses in RGB was smaller when there is a slab portion than when there is no slab portion. In addition, from the difference between the propagation losses when there is a slab portion and when there is no slab portion, it was possible to obtain a result in which the propagation loss in the high-order modes increased and propagation was curbed. Therefore, it was found that being provided with a slab portion is effective for implementation of a single mode.

Figure 6:
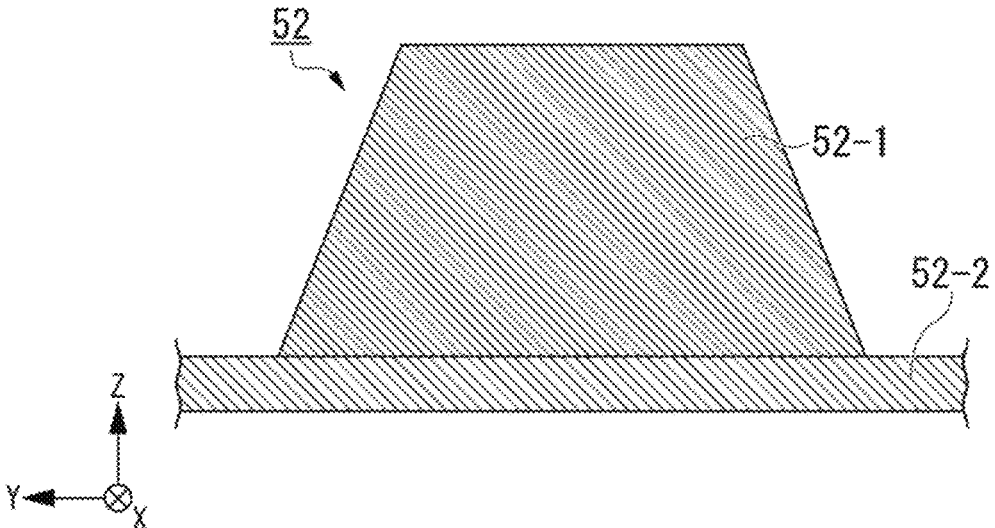
FIG. 6 is a schematic cross-sectional view cut along a YZ plane when a multimode-interference-type optical coupling part has a trapezoidal cross section and has a slab portion on the substrate side.

In addition, as illustrated in FIG. 6, a multimode-interference-type optical coupling part 52 having a trapezoidal cross section may have a ridge 52-1 and may further have a slab portion 52-2 on the substrate side. By having a slab portion, the width dimensional margin may further increase, the optimum width W may further increase, and processing may be further facilitated.

<Waveguide>

It is preferable that the waveguide included in the optical coupler according to the present embodiment be a single-mode waveguide. A single-mode waveguide indicates an waveguide in which light is propagated in a single propagation mode state (single mode), and an waveguide in a state (high-order mode) in which propagation is distributed over a plurality of modes and performed is referred to as a multimode-based waveguide. Since the single mode does not cause mode distribution, an optical transmission loss is smaller and the propagation speed is higher than that in the multimode-based waveguide.

It is preferable that a slab portion be provided on the substrate side in at least a part of the waveguide included in the optical coupler according to the present embodiment.

This is because the width of the RGB waveguide can be widened and the single mode can be achieved.

[Visible Light Source Module]

First Embodiment

Figure 7:
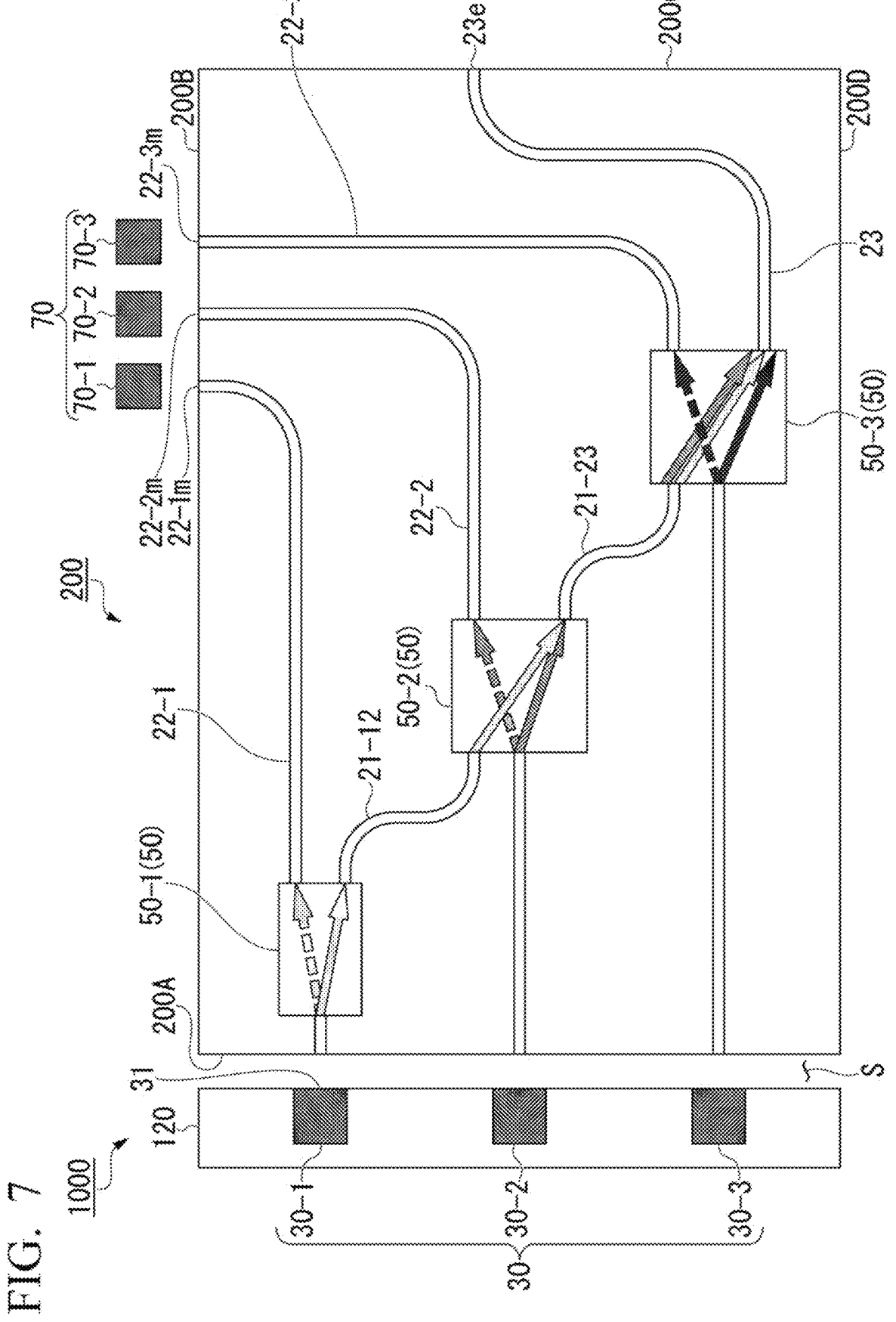
FIG. 7 is a schematic plan view of a visible light, source module according to a first embodiment.

FIG. 7 is a schematic plan view of a visible light, source module according to a first embodiment.

A visible light source module 1000 illustrated in FIG. 7 includes the optical coupler 200 according to the present embodiment, and a plurality of visible laser light sources 30 (30-1, 30-2, and 30-3) that output visible light beams coupled by the optical coupler 200. The optical coupler 200 includes the substrate 10 that is made of a material different from lithium niobate (refer to FIG. 3), and the optical coupling function layer 20 that is formed on the main surface of the substrate 10 and is made of lithium niobate (refer to FIG. 3). The optical coupler 200 has side surfaces 200A, 2008, 200C, and 200D. The optical coupler included in the visible light source module 1000 illustrated in FIG. 7 may be the optical coupler 100.

Regarding the constituent elements illustrated in FIG. 7, the same reference signs are applied to constituent elements having functions similar to those above, and description thereof may be omitted.

Various kinds of laser elements can be used as a visible laser light source 30. For example, commercially available laser diodes (LDs) emitting red light, green light, blue light, and the like can be used. Light having a peak wavelength of 610 nm to 750 nm can be used as red light, light having a peak wavelength of 500 nm to 560 mm can be used as green light, and light having a peak wavelength of 435 nm to 480 nm can be used as blue light.

In the visible light source module 1000, it is assumed that the visible laser light sources, 30-1, 30-2, and 30-3 are respectively an LD emitting green light, an LD emitting blue light, and an LD emitting red light. The LDs 30-1, 30-2, and 30-3 are disposed with a gap therebetween in a direction substantially orthogonal to an output direction of light emitted from each of the LDs and are provided on an upper surface of a subcarrier 120.

In the visible light source module 1000, a case in which the number of visible laser light sources is three has been described as an example, but the number is not limited to three and it need only include a plurality of (four or more) visible laser light sources. In the plurality of visible laser light sources, all the wavelengths of emitting light may differ from each other. In addition, there may be visible laser light sources having the same wavelengths of emitting light. In addition, light other than red (R), green (G), and blue (B) can also be used as the emitting light, and the mounting order of red (R), green (G), and blue (B) described using the drawings is not necessarily this order and can be appropriately changed.

The LD 30 can be mounted on the subcarrier 120 with a bare chip. For example, the subcarrier 120 is constituted using aluminum nitride (AlN), aluminum oxide (Al$_2$O$_3$), silicon (Si), or the like.

The subcarrier 120 can have a configuration in which the subcarrier 120 is directly bonded to the substrate 10 via a metallic layer. With this configuration, since neither spatial coupling nor fiber coupling is performed, further miniaturization can be achieved.

A light output surface 31 of the LD 30 and the light input surface (side surface) 200A of the optical coupler 200 are disposed with a predetermined gap therebetween. The light input surface 200A faces the light output surface 31, and there is a space S between the light output surface 31 and the light input, surface 200A in the x direction. Since the visible light source module 1000 is exposed to the air, the space S is filled with air. Since the space S is in a state of being filled with the same gas (air), it is easy to make each of the color light beams output front the LDs 30 be input to an input path in a state of satisfying predetermined coupling efficiency. When the visible light source module 1000 is used for AR glasses and VR glasses, in consideration of the amount of light and the like required for AR glasses and VR glasses, the size of the space (gap) S in the x direction is larger than 0 μm and 5 μm or shorter, for example.

FIG. 7 illustrates an example including photodetectors 70 (70-1, 70-2, and 70-3). The optical axes of light receiving surfaces of the photodetectors 70 and the monitoring light output ports 22-1$m$, 22-2$m$, and 22-3$m$ are aligned with each other.

Examples of the photodetectors 70 include a semiconductor detector using pn bonding of Si, a semiconductor detector using pn bonding of InGaAs, and a spin photodetector having a magnetoresistive effect function in which a first ferromagnetic layer, a spacer layer, and a second ferromagnetic layer are stacked.

Second Embodiment

Figure 8:
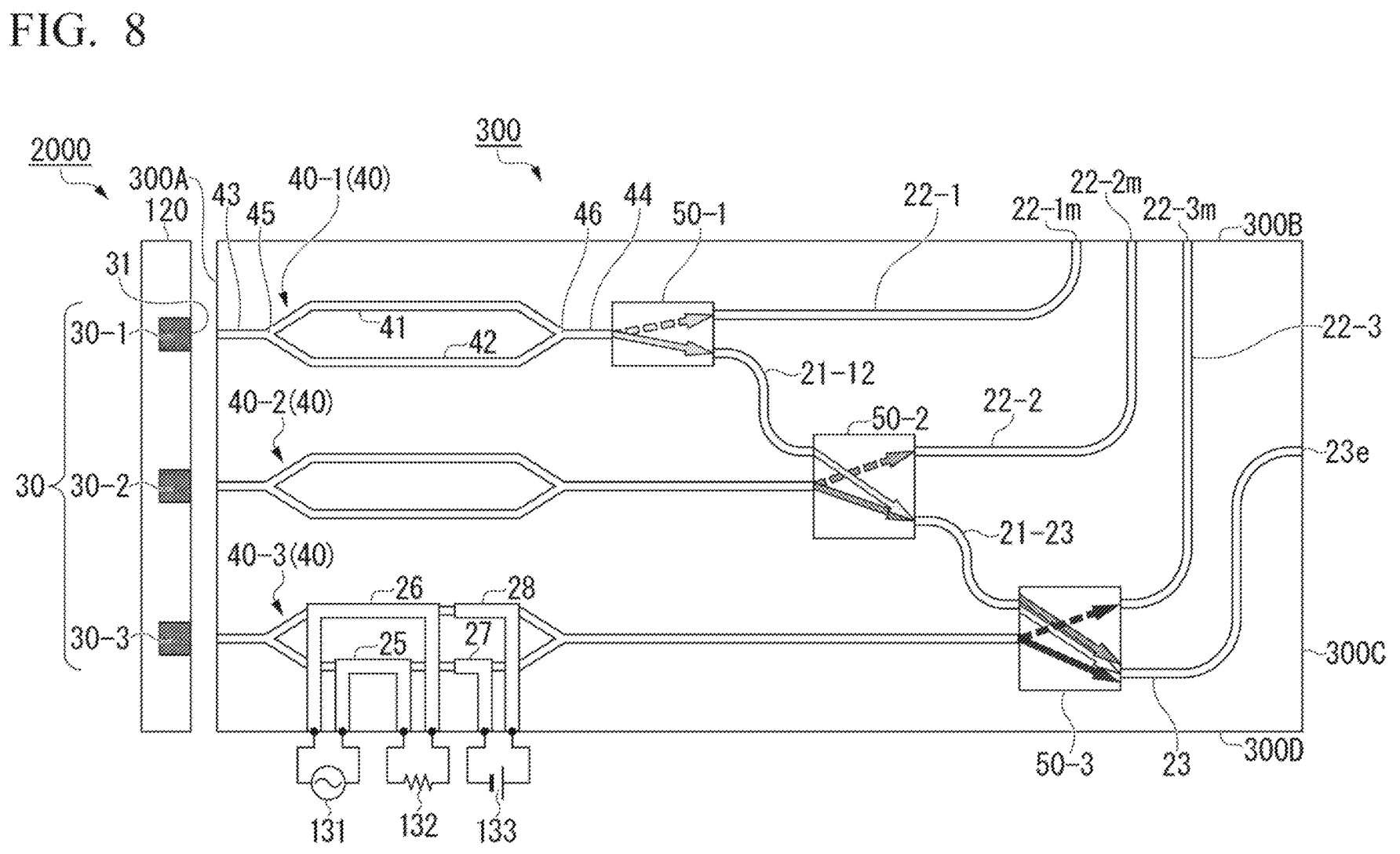

FIG. 8 is a schematic plan view of a visible light source module according to a second embodiment.

A visible light source module 2000 illustrated in FIG. 8 includes an optical coupler 300 with an optical modulation function, and the plurality of visible laser light sources 30 (30-1, 30-2, and 30-3) that output visible light beams coupled by the optical coupler 300 with an optical modulation function. The optical coupler 300 includes the substrate 10 that is made of a material different from lithium niobate (refer to FIG. 3), and the optical coupling function layer 20 that is formed on the main surface of the substrate 10 and is made of lithium niobate (refer to FIG. 3). The optical coupler 300 has side surfaces 300A. 300B, 300C, and 300). Similar to the visible light source module 1000 illustrated in FIG. 7, a photodetector may be provided.

Regarding the constituent elements illustrated in FIG. 8, the same reference signs are applied to constituent elements exhibiting functions similar to those above, and description thereof may be omitted.

The optical coupler 300 with an optical modulation function has a Mach-Zehnder optical modulator 40 in the optical coupling function layer 20 (refer to FIG. 3).

A known Mach-Zehnder optical modulator or a known waveguide can be used as the Mach-Zehnder optical modulator 40, and a light beam having the same wavelength and the same phase is split (spectrally separated) into two beams forming a pair, which are joined (coupled) after different phases are respectively applied thereto. Due to the difference in phase difference, the intensity of the coupled light beam changes.

The optical coupler 300 with an optical modulation function has three Mach-Zehnder waveguides 40-1, 40-2, and 40-3 having the same number as the number of the visible laser light sources 30-1, 30-2, and 30-3. The visible laser light sources 30-1, 30-2, and 30-3 and the Mach-Zehnder waveguides 40-1, 40-2, and 40-3 are placed at predetermined positions such that light beams output from the visible laser light sources are input to the corresponding Mach-Zehnder waveguides.

The Mach-Zehnder waveguides 40 (40-1, 40-2, and 40-3) illustrated in FIG. 8 have a first waveguide 41, a second waveguide 42, an input path 43, an output path 44, a branch portion 45, and a coupling portion 46. The output path 44 is an light-input-side waveguide of the multimode-interference-type optical coupling part. The first waveguide 41 and the second waveguide 42 illustrated in FIG. 8 are configured to extend in a straight line shape in the x direction except for the area in the vicinity of the branch portion 45 and in the vicinity of the coupling portion 46, but they are not limited to such a configuration. The lengths of the first waveguide 41 and the second waveguide 42 illustrated in FIG. 8 are substantially the same. The branch portion 45 is provided between the input path 43, and the first waveguide 41 and the second waveguide 42. The input path 43 is connected to the first waveguide 41 and the second waveguide 42 via the branch portion 45. The coupling portion 46 is provided between the first waveguide 41 and the second waveguide 42, and the output path 44. The first waveguide 41 and the second waveguide 42 are connected to the output path 44 via the coupling portion 46.

Electrodes 25 and 26 are electrodes applying a modulation voltage to each of the Mach-Zehnder waveguides 40-1, 40-2, and 40-3 (which will hereinafter be simply referred to as "each of the Mach-Zehnder waveguides 40"), The electrode 25 is an example of a first electrode, and the electrode 26 is an example of a second electrode. One end of the electrode 25 is connected to a power source 131, and the other end is connected to a terminating resistor 132. One end of the electrode 26 is connected to the power source 131, and the other end is connected to the terminating resistor 132. The power source 131 is a part, of a drive circuit applying a modulation voltage to each of the Mach-Zehnder waveguides 40. For simplification of the diagram, the electrodes 25 and 26 are depicted in only the part of the Mach-Zehnder waveguide 40-3.

Electrodes 27 and 28 are electrodes applying a DC bias voltage to each of the Mach-Zehnder waveguides 40. One end of the electrode 27 and one end of the electrode 28 are connected to a power source 133. The power source 133 is a part of a MX bias application circuit applying a DC bias voltage to each of the Mach-Zehnder waveguides 40.

When a DC bias voltage is superimposed on the electrodes 25 and 26, the electrodes 27 and 28 may not be provided. In addition, a ground electrode may be provided around the electrodes 25, 26, 27, and 28.

For example, the size of the optical coupling function layer 20 is 100 mm² or smaller. If the size of the optical coupling function layer 20 is 100 mm² or smaller, it is suitable for AR glasses and VR glasses.

The optical coupling function layer 20 can be produced by a known method. For example, the optical coupling function layer 20 is manufactured using a semiconductor process such as epitaxial growth, photolithography, etching, vapor phase growth, or metallization.

For example, in retinal projection-type displays, in order to display an image in a desired color, there is a need to independently and quickly modulate the intensities of respective three RGB colors for expressing visible light. If such modulation is performed with respect to only the visible laser light sources (current modulation), the load on the IC that controls modulation thereof will become large, but modulation (voltage modulation) by the Mach-Zehnder optical modulator 40 (optical coupler 200 with an optical modulation function) can also be used together. In this case, coarse adjustment may be performed using a current (visible laser light source) and fine adjustment may be performed using a voltage (Mach-Zehnder optical modulator 40). In addition, coarse adjustment may be performed using a voltage (Mach-Zehnder optical modulator 40) and fine adjustment may be performed using a current (visible laser light source). Since performing fine adjustment using a voltage has better responsiveness, when the responsiveness is emphasized, it is preferable to employ the former method. Since power consumption is curbed because it requires lower current in the case of performing fine adjustment using a current, when curbing of power consumption is emphasized, it is preferable to employ the latter method.

While preferred embodiments of the invention have been described and illustrated above, it should be understood that these are exemplary of the invention and are not to be considered as limiting. Additions, omissions, substitutions, and other modifications can be made without departing from the spirit or scope of the present invention. Accordingly, the invention is not to be considered as being limited by the foregoing description, and is only limited by the scope of the appended claims.

EXPLANATION OF REFERENCES

10 Substrate
10A Surface of substrate
20 Optical coupling function layer
24 Waveguide core film
25 Waveguide cladding film
30 Visible laser light source
40 Mach-Zehnder optical modulator
50, 50-1, 50-2, 50-3 Multi mode-interference-type optical coupling par
100, 200, 300 Optical coupler

What is claimed is:

1. An optical coupler which couples a plurality of visible light beams having different wavelengths and has four side surfaces, the optical coupler comprising:
   a plurality of light input ports that are disposed on a first side surface of the optical coupler and are configured for each of the visible light beams output from a plurality of visible laser light sources to be input to each of the light input ports, respectively;
   a plurality of monitoring light output ports that are disposed on a second side surface of the optical coupler and are configured to output monitoring light beams to at least one photodetector monitoring outputs of the visible light beams from the laser light sources;
   one light output port that is disposed on a third side surface of the optical coupler and is configured for a coupled light beam, in which all visible light beams output from the visible laser light sources are coupled, to be output; and
   a plurality of multimode-interference-type optical coupling parts,
   wherein, among the multimode-interference-type optical coupling parts,
      a first multimode-interference-type optical coupling part is configured to be used with one input and two outputs, a light input side thereof being connected to a first light-input-side waveguide, which is connected to a first light input port among the light input ports, and a light output side thereof being connected to a first monitoring-light-output-side waveguide, which is connected to a first monitoring light output port among the monitoring light output ports, and a first connecting waveguide, which is connected to an light input side of a second multimode-interference-type optical coupling part,
      the second multimode-interference-type optical coupling part is configured to be used with two inputs and two outputs, a light input side thereof being connected to a second light-input-side waveguide, which is connected to a second light input port among the light input ports, and the first connecting waveguide, and a light output side thereof being connected to a second monitoring-light-output-side waveguide, which is connected to a second monitoring light output port among the monitoring light output ports, and a second connecting waveguide, which is connected to a light input side of a third multimode-interference-type optical coupling part, and
      the third multimode-interference-type optical coupling part is configured to be used with two inputs and two outputs, a light input side thereof being connected to a third light-input-side waveguide, which is connected to a third light input port among the light input ports, and the second connecting waveguide,
and a light output side thereof being connected to a third monitoring-light-output-side waveguide, which is connected to a third monitoring light output port among the monitoring light output ports, and a light-output-port-connected waveguide connected to the light output port,
the first monitoring-light-output-side waveguide, the second monitoring-light-output-output-side side waveguide, and the third monitoring-light-output-side waveguide are free of an intersection with any waveguides, and
only light from the first light input port is received in the first monitoring-light-waveguide, only light from the second light input port is received in the second monitoring-light-output-side waveguide, and only light from the third light input port is received in the third monitoring-light-output-side waveguide.

2. The optical coupler according to claim 1 comprising:
a substrate that is made of a material different from lithium niobate; and
an optical coupling function layer that is formed on a main surface of the substrate and is made of lithium niobate,
wherein the light input ports, the monitoring light output ports, the light output port, the multimode-interference-type optical coupling parts, the first light-input-side waveguide, the second light-input-side waveguide, the third light-input-side waveguide, the first monitoring-light-output-side waveguide, the second monitoring-light-output-side waveguide, the third monitoring-light-output-side waveguide, the first connecting waveguide, the second connecting waveguide, and the light-output-port-connected waveguide are formed in the optical coupling function layer.

3. The optical coupler according to claim 1,
wherein the plurality of multimode-interference-type optical coupling parts consists of three multimode-interference-type optical coupling parts.

4. The optical coupler according to claim 1,
wherein at least one multimode-interference-type optical coupling part of the multimode-interference-type optical coupling parts has a trapezoidal cross section cut in a direction perpendicular to a traveling direction of light.

5. The optical coupler according to claim 4,
wherein an inclination angle of the trapezoidal shape is 40° to 85°.

6. The optical coupler according to claim 4,
wherein the multimode-interference-type optical coupling part having the trapezoidal cross section has a slab portion on the-a substrate side.

7. The optical coupler according to claim 1,
wherein a slab portion is provided in at least a part of the first light-input-side waveguide, the second light-input-side waveguide, the third light-input-side waveguide, the first monitoring-light-output-side waveguide, the second monitoring-light-output-side waveguide, the third monitoring-light-output-side waveguide, the first connecting waveguide, the second connecting waveguide, and the light-output-port-connected waveguide.

8. A visible light source module comprising:
the optical coupler according to claim 1; and
a plurality of visible laser light sources that are configured to output visible light beams to be coupled by the optical coupler.

9. An optical coupler with an optical modulation function comprising:

the optical coupler according to claim 1; and a Mach-Zehnder optical modulator that is connected to the optical coupler and is configured to guide a plurality of visible light beams output from a plurality of visible laser light sources to the optical coupler.

10. A visible light source module comprising:

the optical coupler with an optical modulation function according to claim 9; and a plurality of visible laser light sources that are configured to output visible light beams to be coupled by the optical coupler with an optical modulation function.

* * * * *